United States Patent [19]

Krenceski et al.

[11] Patent Number: 5,268,215
[45] Date of Patent: Dec. 7, 1993

[54] BASECOAT-CLEARCOAT FILM

[75] Inventors: Mary A. Krenceski, Rochester; Richard W. Wheeler, Pittsford; Robert P. Bouvy, Rochester, all of N.Y.

[73] Assignee: Eastman Kodak Company, Rochester, N.Y.

[21] Appl. No.: 781,689

[22] Filed: Oct. 25, 1991

Related U.S. Application Data

[63] Continuation of Ser. No. 401,388, Aug. 31, 1989, abandoned.

[51] Int. Cl.$^5$ ................................................ B32B 7/02
[52] U.S. Cl. ............................ 428/213; 428/215; 428/332; 428/423.3; 428/447
[58] Field of Search ............ 428/423.3, 447, 213, 428/215, 332

[56] References Cited

U.S. PATENT DOCUMENTS

| | | | |
|---|---|---|---|
| 3,463,662 | 8/1969 | Hodes | 117/118 |
| 3,551,830 | 12/1970 | Hodge et al. | 117/76 |
| 4,190,699 | 2/1980 | Vianazawa et al. | 428/412 |
| 4,499,149 | 2/1985 | Berger | 428/447 |
| 4,528,243 | 7/1985 | Kookootsedes et al. | 428/425.5 |
| 4,550,052 | 10/1985 | Malek | 428/323 |
| 4,681,811 | 7/1987 | Simpson et al. | 428/413 |
| 4,719,132 | 1/1988 | Porter, Jr. | 427/409 |
| 4,728,571 | 3/1988 | Clemens et al. | 428/352 |
| 4,734,317 | 3/1988 | Bothe et al. | 428/215 |
| 4,734,318 | 3/1988 | Crass et al. | 428/216 |
| 4,777,063 | 10/1988 | Dubrow et al. | 427/44 |
| 4,791,168 | 12/1988 | Salatin et al. | 524/601 |
| 4,844,986 | 7/1989 | Karakelle et al. | 428/447 |
| 4,847,120 | 7/1989 | Gent | 427/387 |
| 4,913,958 | 4/1990 | Skaggs et al. | 428/318.6 |
| 4,933,237 | 6/1990 | Krenceski et al. | 428/423.7 |
| 4,961,997 | 10/1990 | Asano et al. | 428/423.1 |

FOREIGN PATENT DOCUMENTS 293084 11/1988 European Pat. Off. .
1288361 9/1972 United Kingdom .

OTHER PUBLICATIONS

"Information about Organofunctional Silicone Fluids", Dow Corning® 1248 Fluid, Form No. 22-713A-82.
"Information about Silicone Fluids" Dow Corning® Fluid, Bulletin 22-069 Oct. 1971.
"Organofunctional Silicone Fluids-Silicone Polycarbinols-", Dow Corning New Product Information.

Primary Examiner—Paul J. Thibodeau
Assistant Examiner—R. Follett
Attorney, Agent, or Firm—Nixon, Hargrave, Devans & Doyle

[57] ABSTRACT

A flexible paint-coated film which has a basecoat-clearcoat appearance and good mar-resistance is prepared by coating a polyurethane paint layer on a flexible polymeric carrier film. Over the paint layer is coated a clear polyurethane layer. Over the latter is coated a relatively thin layer of a clear polyurethane composition obtained by the reaction of a polyisocyanate with a reactive poly(dialkylsiloxane). Preferably, the latter has at least two active-hydrogen-containing groups, which are hydroxyl, mercapto, primary amino or secondary amino groups.

To manufacture the film the compositions are coated on the carrier film by a laminar flow process using an extrusion coating hopper. The resulting film has outstanding gloss and beauty and improved mar resistance. Certain embodiments of the new film can be thermoformed, stretched and bonded adhesively to automobile body parts, boats, or household appliances and other substrates as protective and decorative coverings having a basecoat-clearcoat appearance. Others can be applied to such substrates without substantial stretching as toning and styling stripes.

16 Claims, 2 Drawing Sheets

BASECOAT-CLEARCOAT FILM

This application is a continuation of application Ser. No. 07/401,388 filed Aug. 31, 1989, now abandoned.

FIELD OF THE INVENTION

This invention relates to paint-coated film having a basecoat-clearcoat appearance and, more particularly, to such a film having improved resistance to marring. It also relates to a method for making such films.

BACKGROUND

As an improvement over the spray painting of articles such as automobile bodies, boats and household appliances, a new kind of paint-coated sheet material or film has been developed to provide protective and decorative finishes. The new material comprises a flexible, stretchable, thermoplastic support sheet, also known as a carrier film, which has on one side a paint layer, also called a basecoat, of uniform thickness and appearance and, optionally, on the other side an adhesive layer. It can also have other layers such as a tie or bonding layer between the paint layer and the carrier film. In a preferred embodiment a transparent topcoat, also called a clearcoat, covers the paint layer. This combination provides an attractive basecoat-clearcoat or clear-over-color appearance.

Using known thermoforming procedures such as vacuum forming and in-mold bonding, preferred types of the paint-coated sheet material can be stretched and bonded to automobile body panels or other articles to provide a basecoat-clearcoat finish. Advantages over obtaining such finishes by spray painting include economy in the use of paint and improved control of evaporating solvents, which reduces air pollution. Furthermore, the new material has a remarkably smoother and more attractive appearance than spray painted finishes.

The new type of thermoformable sheet material and a process for its manufacture are described in the U.S. patent application of G. G. Reafler Ser. No. 116,426, filed Nov. 3, 1987 now abandoned. The process involves applying the paint composition to the surface of the thermoplastic carrier film by laminar flow coating, followed by drying and then coating and drying each additional layer in sequence to obtain a paint-coated film of excellent gloss and smoothness.

Preferred basecoat and clearcoat compositions for the paint-coated films are polyurethanes. They are especially preferred because of their flexibility and good weather resistance. A problem, however, is that these flexible polyurethane coatings are more susceptible to marring than are harder, rigid thermoset polymers which can be used as clearcoats when flexibility is not required. Marring is an injury to the coating which, though related, is different from scratching. The latter involves cutting into the polymer surface, often times all the way to the substrate. The polyurethanes are resistant to this kind of injury within reasonable limits. Marring on the other hand is the forming of a depression in the polymer surface by contact with a blunt object under conditions not severe enough to cause a scratch. Since basecoat-clearcoat finishes on automobiles, boats and the like are subject to such contacts, improvement in the mar-resistance of flexible paint-coated films of the basecoat-clearcoat type to be used for such purposes is desirable. Furthermore, it is desirable that the mar-resistance be persistent or permanent and not be lost when the finish contacts solvents commonly encountered by automobile finishes.

It is also desirable, while improving mar resistance, to preserve the capability of laminar flow coating, inasmuch as this method of coating is responsible for many of the valuable properties of the new paint-coated films, such as gloss, distinctness of image (DOI) and geometric metamerism (commonly called "flop").

The present invention provides novel paint-coated films having flexible basecoat-clearcoat finishes which have improved resistance to marring and which can be formed by laminar flow coating. The resulting products, hence, have outstanding qualities of gloss, DOI and flop plus improved mar resistance. The layers of the films have good adhesion to each other and the clear layers are free of undesirable haze. Preferred embodiments of the films are thermoformable. They can be stretched up to 100 percent in area and bonded to the contours of three-dimensional substrates by thermoforming without tearing and while retaining gloss and DOI in the stretched areas.

BRIEF SUMMARY

The protective and decorative sheet material of the invention comprises:

a flexible and, preferably, thermoformable carrier film;

a flexible paint layer coated on the carrier film;

a polyurethane clearcoat layer coated on the paint layer; and a mar-resistant polyurethane clear topcoat layer coated on the clearcoat, the mar-resistant topcoat a) being thinner than said clearcoat layer, and b) being the reaction product of a mixture comprising a polyisocyanate and a reactive poly(dialkylsiloxane) having at least one reactive group, and c) having a persistently low friction coefficient.

The method of the invention for making a mar-resistant flexible sheet material having a basecoat-clearcoat appearance comprises forming a basecoat layer on a flexible polymeric carrier film by laminar flow coating; mixing a polyol component and a polyisocyanate component of a clearcoat composition as a solution and promptly thereafter coating the resulting mixture by laminar flow coating as a clearcoat over the basecoat layer, mixing a polyisocyanate component with a reactive silicone component as a solution and coating the resulting solution by laminar flow coating as a topcoat over the clearcoat promptly after mixing the components, the topcoat being thinner than the clearcoat, and the reactive silicone component being a poly(dialkylsiloxane) having at least one group that is reactive with the polyisocyanate.

THE DRAWINGS

The invention will be further described by reference to the drawings, of which.

DETAILED DESCRIPTION

Figure 1:
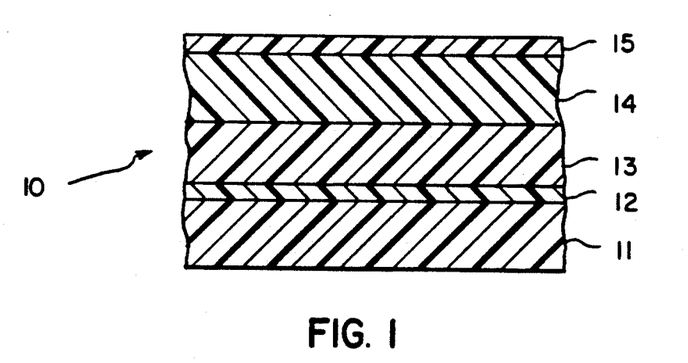
FIGS. 1-2 are diagrammatic cross-sections, not to scale, of protective and decorative sheet materials of the invention.

FIG. 1 is a cross-section of one embodiment of a thermoformable sheet material 10 of the invention.

Layer 11 is a flexible and stretchable, thermoplastic polymeric carrier film. Coated on the carrier film 11 is a protective and decorative paint layer 13, as used in automotive finishes.

Although not essential with all combinations of carrier films and paint compositions, a thin tie layer 12 can be coated and dried on the carrier film before the paint layer is coated in order to improve the bonding of the paint layer to the carrier film.

Coated on the upper surface of the paint layer is a flexible, thermoformable, polyurethane clearcoat layer 14. Compositions for the clearcoat layer include crosslinkable clearcoat compositions employed in automotive surface finishing. They are transparent and comprise (a) as one component, a crosslinkable polymeric polyol such as a polyester polyol, a polyurethane polyol, or an acrylic polyol and (b) as a second component, a polyisocyanate curing or crosslinking agent. These components are mixed and dissolved in a volatile organic solvent such as acetone or toluene. For example, a polyurethane polyol is diluted to 58% solids with toluene and a polyisocyanate is diluted to 85% solids with acetone. Promptly after mixing, the reactive mixture is coated over the paint layer. It is dried and cured by heating to form a crosslinked polyurethane clearcoat.

An example of such a composition is the solvent-based system comprising a polyurethane polyol as one component and an aliphatic polyisocyanate as the other, as disclosed in the patent to Porter, U.S. Pat. No. 4,719,132. Especially preferred is a two-component composition disclosed in this patent, of which one component comprises a crosslinkable poly (esterurethane) polyol and the other comprises an aliphatic polyisocyanate crosslinking agent such as a polyfunctional isocyanurate of 1,6-hexamethylene diisocyanate.

Other useful clearcoat compositions include those described in the patents to Ambrose et al, U.S. Pat. No. 4,699,814; Simpson et al, U.S. Pat. No. 4,650,718; Singer et al, U.S. Pat. No. 4,681,811; Singer et al, U.S. Pat. No. 4,703,101; and Backhouse, U.S. Pat. No. 4,220,679 and U.S. Pat. No. 4,403,003. All of these and the other patents cited herein are incorporated by reference.

In accordance with the present invention, a transparent polyurethane-siloxane topcoat 15 is coated over the clearcoat. The topcoat is also coated from a reactive mixture. The reactive components of this mixture comprise an aliphatic polyisocyanate and a reactive poly(dialkylsiloxane) and, preferably, consist essentially of (a) a polymeric polyol, (b) an aliphatic polyisocyanate and (c) a reactive poly(dialkylsiloxane). Preferably the composition also includes a small amount of a catalyst, such as dibutyl tin dilaurate to promote the desired reactions of the polyol, isocyanate and reactive siloxane. As with the clearcoat, the topcoat is formed by mixing the reactive components (and catalyst) in solution and coating the solution promptly after mixing. Inert organic solvents are used such as toluene and acetone. The polymeric polyol and the reactive siloxane can be in one solution and the polyisocyanate in another, the two being mixed just before coating.

Figure 3:
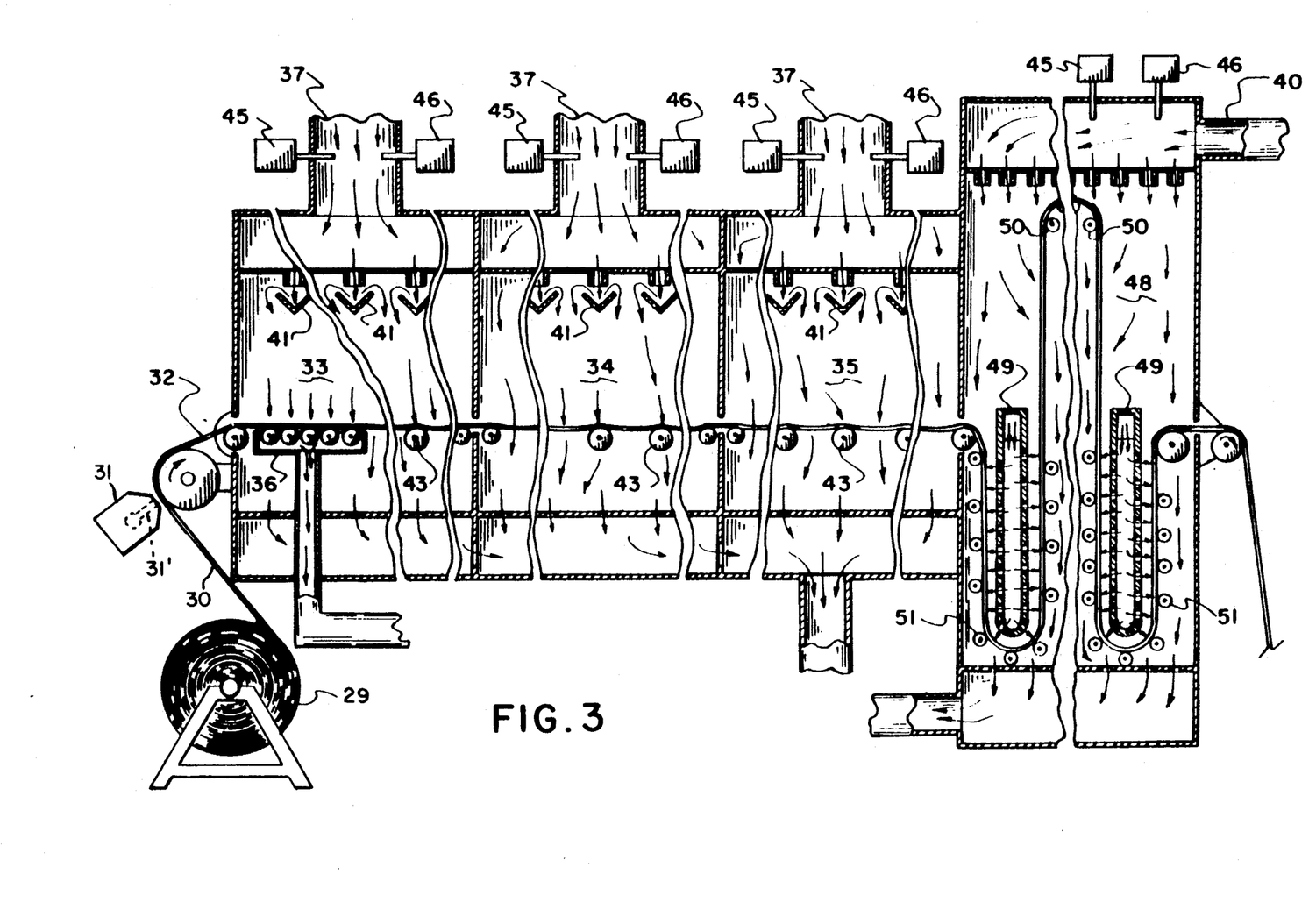
FIG. 3 is a diagrammatic representation of coating and drying apparatus with which sheet material of the invention can be manufactured.

FIG. 3 illustrates diagrammatically a preferred coating and drying apparatus which can be used to manufacture the sheet material of the invention by the preferred procedures of laminar flow coating and plural stage drying. Coating hopper 31 is an extrusion coating hopper such as the type disclosed by Beguin, U.S. Pat. No. 2,681,294. The coating hopper extrudes in laminar flow through a narrow slot a horizontally extending bead of the coating liquid in contact with the continuously moving carrier film web 30. The coating composition is thus coated as a uniform layer onto the surface of the web. The first layer coated on the web can be tie-layer 12 or paint layer 13, as shown in FIG. 1. In either case, the carrier film web supplied by roll 29, whether or not previously coated, passes in close proximity to the narrow extrusion slot 31' of the coating hopper 31. As the web passes the hopper, a laminar flow of the coating composition is extruded on the web, the entire thickness of the coating for that particular pass being applied simultaneously across the width of the web. Promptly after being coated, the web having the wet layer on its surface is drawn through the drying apparatus.

The coated web 32 is pulled or drawn by take-up rollers not shown in the drawing through successive stages of the drying apparatus. These include initial drying stages 33, 34, 35 and final curing stage 48. Preferably the stages are at successively higher temperatures, the temperatures of the initial stages of the drying zone being mild. This is especially desirable when drying an aqueous paint which contains water and organic solvents. The final stage or stages, however, can be at high temperatures to remove residual liquids and/or to cure the crosslinkable clearcoat or topcoat. For example, heated air can be introduced at 27° C., 43° C. and 66° C. via lines 37 at stages 33, 34 and 35, respectively. Baffles 41 divert the air flow away from the top of the film and cause it to flow to lower regions of the drying chamber. Sensing controls 45 and 46 aid in maintaining the appropriate air temperature and humidity by feedback mechanisms not shown in the drawing. The speed of the web is such that the coating is subjected to elevated temperature for a substantial time, e.g., for 3 to 6 minutes, in the final stage 48 where the air is admitted via line 40 at about 80° C.

Preferably, the moving web is also heated from its underside by contact with metal rollers 36 and 43 and other rollers in the several drying stages. These metal rollers of high conductivity are heated by the warm air and they transfer heat to the underside of the web, thus further increasing its temperature. In the final stage 48, the web is heated to its highest temperature as it travels through a vertical path in a floating loop section, being guided by rollers 50 and air reversers of the plenums 49 to keep the coated side of the film out of contact with rollers 51. The dried film leaving stage 48 is wound on a take-up roll not shown in the drawing.

In the preferred method of applying the transparent clearcoat and topcoat over the paint layer, the paint layer is coated and dried and thereafter the clearcoat and topcoat are applied by the same laminar flow coating method as used for applying the tie-layer and paint layer. In this method, the film having on its surface the dried paint layer and clearcoat is again passed in close proximity to the narrow extrusion slot of an extrusion coating hopper 31, as shown in FIG. 3, from which the topcoat composition is extruded in laminar flow. Again, as with the paint and clearcoat layers, the entire thickness of topcoat to be applied in the particular pass is applied simultaneously across the width of the dried paint layer. Promptly thereafter the web having the wet topcoat layer on its surface is drawn through the drying apparatus.

Since the clearcoat for the preferred sheet material of the invention is thick, it is preferred to coat such layers in two or more passes in order to dry them adequately. For example, if the clearcoat dry thickness is to be 0.12 mm, a first pass can coat and dry a layer of 0.06 mm dry thickness and a second pass can coat and dry a second layer to raise the total dry thickness to 0.12 mm. For greater thickness, additional coating and drying passes can be carried out.

For optimum quality the stepwise increase in drying temperatures and other procedures such as humidity control, of the Fronheiser et al. drying process described in U.S. patent application Ser. No. 166,083, are also preferred for drying the clearcoat and topcoat layers.

If the drying conditions are carefully controlled, e.g., by providing small temperature increases from stage to stage and having a lengthy residence time in each stage, the entire thickness of the clearcoat can be coated and dried in a single pass. However, since the clearcoat is extremely thick in the preferred sheet materials of the invention, i.e., greater than 0.1 mm when dry, the best quality is obtained when the clearcoat is coated and dried in two or more passes. The topcoat, being much thinner, can be dried in a single pass.

It is also possible to coat the topcoat simultaneously with the clearcoat layer. This wet-on-wet method of coating can be carried out with laminar flow coating hoppers suitable for simultaneous coating of multiple layers. Examples of such coating hoppers include U.S. Pat. Nos. 2,761,419; 2,761,791 and 3,005,440. Although these simultaneous multilayer coating techniques can be used, best results are obtained when the paint layer is coated and dried separately and then successive layers of the clearcoat and topcoat are coated and dried in two or more separate passes using an extrusion hopper as in U.S. Pat. No. 2,681,294 and drying each layer after it is coated.

As has already been discussed, the reactive components of the clearcoat and of the topcoat are mixed just before they are coated over the previous layer on the carrier film. A preferred way of mixing these components is disclosed in the patent to Hayward et al., U.S. Pat. No. 4,832,991, which describes the use of an in-line static mixer placed just before the coating apparatus. In the method of the present invention, such a mixer can be placed in the inlet line, not shown in the drawing, for hopper 31 of FIG. 3.

Another preferred mixing procedure is disclosed in the patent to Fronheiser, U.S. Pat. No. 4,835,021. In this embodiment the hopper 31 is a slotted dual extrusion coating hopper of the type disclosed in the patent to Miller et al., U.S. Pat. No. 3,206,323. The reactive components of the clearcoat or topcoat are fed separately to the hopper chambers and converge at the orifice of the coating hopper. Hence, mixing is delayed until the streams converge at the orifice where they mix to initiate crosslinking. In this procedure both mixing and laminar flow coating are carried out by the coating hopper.

Certain advantages of the invention are obtained to some degree even when the polyol and the polyisocyanate of the clearcoat and of the topcoat are not identical. The fact that in both coatings the reaction product is a polyurethane means that the coatings have substantial compatibility and thus adhere well to each other. In the preferred embodiment of the invention, however, the polyol and the polyisocyanate for the clearcoat and the topcoat are chemically the same and the coatings differ chemically only in that the topcoat contains a third component, i.e., the reactive poly(dialkylsiloxane). Consequently, the two layers adhere to each other extremely well. In addition they have compatible stretching properties.

A thick clearcoat is desirable. This provides the best "wet" look and optical depth. Thickness of the clearcoat also gives a benefit when the film is stretched during application to a substrate (as in thermoforming). If the clearcoat is thin, the gloss decreases in stretched areas, especially when the basecoat contains metallic flakes. By using a thick clearcoat, this loss of gloss is eliminated or reduced. On the other hand, if a thick, urethane-siloxane clearcoat is formed by the use of a preferred laminar flow extrusion coating hopper, e.g., as in the patent to Beguin, U.S. Pat. No. 2,681,294, serious coating difficulties arise.

The difficulties include the formation of repellencies or craters in the coated layer. This can be corrected to some extent by diluting the urethane-siloxane composition to a low solids content. This, however, excessively increases the drying costs for the process and creates problems in solvent recovery.

Another potential problem in coating a urethane-siloxane clearcoat composition directly on a basecoat, especially a non-urethane basecoat, is poor adhesion.

The present invention solves or reduces both of these problems. By coating the normal urethane clearcoat directly on the basecoat and then coating the urethane-siloxane topcoat over the clearcoat, adhesion problems are reduced.

Most importantly, however, the method of the invention permits the use of laminar flow extrusion coating hoppers without serious coating difficulties such as repellencies or craters. The reason for this desirable result is that the relatively thick urethane clearcoat can be coated at a high solids content in the laminar flow process. This economizes in the drying process and in solvent recovery. On the other hand, the thin layer of urethane-siloxane composition, which is difficult to coat by laminar flow extrusion at high solids concentration, can be coated at such a low solids content or high dilution that coating difficulties are avoided. Yet, since the layer is thin, i.e., the quantity of urethane-siloxane solution coated per unit area is so small, the drying costs and solvent recovery costs are not excessive.

As already stated, the silicone component of the polyurethane-siloxane topcoat composition is a low molecular weight poly(dialkylsiloxane) which has at least one reactive group. By "reactive group" is meant groups that react with the polyisocyanate component to bond the siloxane moiety to the polyurethane chain. The alkyl groups of the silicone are lower alkyl groups, e.g., of 1 to 4 carbon atoms. Dimethylsiloxane is preferred.

The preferred reactive siloxane component is a poly(dialkylsiloxane) which has at least two active hydrogen-containing groups selected from the group consisting of hydroxyl, mercapto, primary amino and secondary amino. Such groups are highly reactive with the polyisocyanate component of the coating composition.

Commercially available examples of useful reactive siloxane polymers include:
 (a) Hydroxyl-functional:
  (1) Dow Corning ® 1248 Fluid, a graft copolymer of the type wherein R is an organic spacer, x is approximately 30 and y is approximately 3. Significant features of this low molecular weight silicone polymer (~6000 m.w.) are that the hydroxyl groups are secondary and the alcohol moiety is attached to the silicone chain via a non-hydrolyzable Si—C bond. This product is available from Dow Corning Corporation, Midland, Mich. 48640.

(2) TEGO® OF-1010 and TEGO® OF-1025 α-ω-hydroxy organo functional poly(dimethylsiloxanes) of the structure wherein n = approximately 9 for TEGO® OF-1010 or approximately 24 for TEGO® OF-1025. This and the other TEGO® products are available from Goldschmidt Chemical Corporation, Hopewell, Va. 23860.

(3) TEGO® Glide 410 polysiloxane polyether copolymer of the formula wherein x ≈ 70 mol %, y ≈ 15 mol % and z ≈ 15 mol %
(b) Amino-functional:
(1) TEGO® OF-2010 and TEGO® OF-2025 α-ω-amino organo functional polydimethylsiloxanes of the structure wherein n = approximately 9 for TEGO® OF-2010 and approximately 24 for TEGO® OF-2025.

(2) PS513 aminopropyl terminated poly(dimethylsiloxane) of the formula wherein the molecular weight is approximately 27,000. This product is available from Petrarch Systems, Bristol, Pa. 19007.

The dried urethane-siloxane topcoat is thinner and, preferably, is much thinner than the clearcoat. Thus, the dry clearcoat 14 can range in thickness from about 0.025 mm (1 mil) to 0.25 mm (10 mils) or even higher. The dry thickness of the siloxane-containing topcoat 15 preferably is the range from about 0.0005 to 0.005 mm (0.02 to 0.2 mils).

It has been found, as disclosed in copending U.S. patent application Ser. No. 287,417 of Gerald G. Reafler, filed Dec. 20, 1988, that a clearcoat thickness greater than 0.1 mm (4 mils) improves the retention of gloss in stretched areas when a sheet material having a metallic flake basecoat is thermoformed. Hence, in the preferred sheet materials of the present invention the clearcoat is thick. In such preferred sheet materials the total dry thickness of the clearcoat and the topcoat is at least 0.1 mm and most preferably is at least 0.25 mm. It is also preferred that the silicone-containing topcoat be relatively thin. Of the total thickness of the two layers, the clearcoat is the major part. Preferably, its thickness is from 10 to 100 times greater than that of the topcoat.

As a consequence of coating such a thin silicone-containing topcoat over the clearcoat, the stretchability, the adhesion to the paint layer and the retention of gloss when stretched are influenced mainly by the thicker clearcoat. Nevertheless, as the applicants have found, the topcoat, although thin, markedly improves the mar-resistance of the sheet material. Furthermore, this useful property is persistent. That is to say, it is not lost when the sheet material is scrubbed with a solvent such as isopropanol to which automobile finishes often are subjected as a result of its use in windshield washer liquids.

Figure 2:
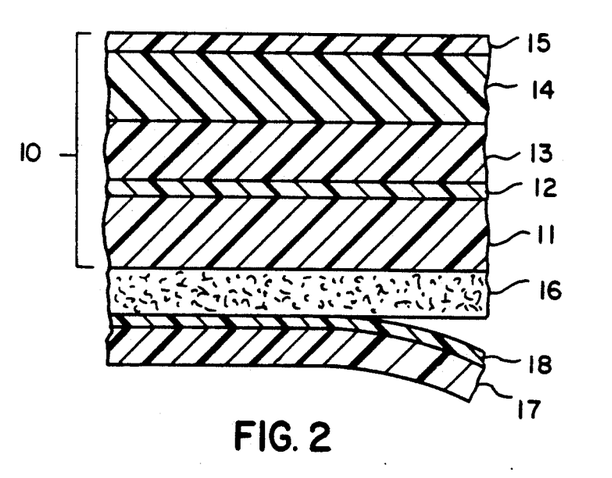

FIG. 2 shows one form of a sheet material of the invention having coated on the side of the carrier film opposite to the paint layer, a pressure-sensitive adhesive back layer 16. This provides a means for securely bonding the sheet material to a substrate such as an automobile panel. Following the application of the adhesive layer 16, the sheet material is interwound with a thin release sheet 17 of, e.g., polyester film to permit tack-free winding of the finished sheet material on a core. An optional silicone release coating 18 can be on the release sheet 17 to aid in stripping it from the adhesive back layer prior to thermoforming the sheet material to a substrate.

The carrier film for the sheet material is an essentially planar, self-supporting, stretchable, flexible, thermoplastic polymeric film which can be transparent, translucent or opaque. It has a substantially uniform thickness, preferably, in the range from about 0.05 to 0.50 millimeter (2–20 mils). A preferred thickness is in the range from about 0.16 to 0.32 millimeters (6–13 mils).

The carrier film has heat softening and tensile elongation properties suitable for the thermoforming process. Preferred polymers for the film are those known to be useful in thermoforming and/or vacuum-forming techniques, such as polyvinyl chloride, polyvinyl acetate, ABS (acrylonitrile-butadiene-styrene) resins, polyethylene and polypropylene. Useful carrier film compositions include the polyacrylate blends with copolyesters described in U.S. Pat. No. 4,246,381, and the copolyesters derived from aromatic polyesters and glycol polyesters described in U.S. Pat. No. 4,287,325. Blends of rubber-modified styrene-maleic anhydrides with polycarbonates and/or polyesters are also useful, as are blends of poly(ether-esters) and polyesters. Particularly preferred carrier film polymers exhibit a tensile elongation at break of at least about 40 percent when measured in accordance with ASTM D-638. A highly preferred carrier film composition is a blend of copolyesters based on poly(1,4-cyclohexanedimethylene terephthalate) and rubber-modified styrene-maleic anhydride copolymers as described in U.S. Pat. No. 4,582,876. A specific example of a polymer blend of this kind which can be extruded as a carrier film consists of a blend of 55:45% by weight of a copolyester and "Dylark 600" styrene copolymer. The latter is a rubber-modified styrene-maleic anhydride copolymer available from ARCO Chemical Company, a division of Atlantic Richfield Company. The copolyester is derived from terephthalic acid, 19 mole % ethylene glycol and 81 mole % 1,4-cyclohexanedimethanol.

Other examples of stretchable carrier films include the highly flexible and stretchable films which are made by the extrusion of blends of a flexible poly(ether-ester) with a more rigid polyester as described in the copending application of Seymour, Ser. No. 151,727, filed Feb. 7, 1988 now U.S. Pat. No. 4,904,748. The carrier film can include fillers, UV absorbers, plasticizers, colorants, antioxidants, etc., known to be useful in polymeric films.

Paint or basecoat layers for the sheet materials have a colorant and/or light reflective flakes incorporated in the film-forming binder. Conventional colorants for paint compositions can be employed, including inorganic pigments such as titanium dioxide, iron oxide, chromium oxide, lead chromate, carbon black, silica, talc, china clay, metallic oxides, silicates, chromates, etc., and organic pigments, such as phthalocyanine blue, phthalocyanine green, carbazole violet, anthrapyrimidine yellow, flavanthrone yellow, isoindoline yellow, indanthrone blue, quinacridone violet, perylene reds, diazo red and others known to those skilled in the art.

Any light-reflective flakes conventionally employed in paints, particularly those employed in automotive finish paints can be used. Suitable reflective flakes include metallic flakes such as aluminum flake, copper flake, bronze flake, copper bronze flake, nickel flake, zinc flake, magnesium flake, silver flake, gold flake, platinum flake and other platelets such a mica, glass, stainless steel, coated mica, coated glass, and aluminum coated polyester film fragments. Mixtures of two or more types can be use.

The film-forming binder for the basecoat preferably is a polyurethane but other flexible film-forming resins conventionally used as binders in basecoat compositions can be used, such as acrylic polymers and polyesters, including alkyds. Examples of such binders are described in U.S. Pat. Nos. 4,681,811; 4,403,003 and 4,220,679.

Most of the polymers described in the above references are organic solvent-based polymers, although acrylic polymers can be prepared via aqueous emulsion polymerization techniques and used as aqueous-based basecoat compositions. Water-based basecoats in color-plus-clear compositions are disclosed in U.S. Pat. No. 4,403,003, and the resinous compositions used in preparing these basecoats can be used in the practice of this invention. Water-based polyurethanes such as those described in U.S. Pat. Nos. 4,719,132 and 4,147,679 are examples of preferred binders for the paint layer.

The dried paint layer preferably has a mean thickness in the range of from about 0.012 and 0.080 millimeters (0.5–3 mils). A particularly preferred mean thickness is in the range of from about 0.020 to 0.060 millimeters (0.8–2.4 mils). The paint layer preferably is applied by forming a laminar flow of the paint composition, and directing the flow into contact with the moving carrier film web to form a paint layer.

The preferred method for coating the layers in the method of the invention is laminar flow coating, using an extrusion coating hopper as disclosed, for example, in the patent to Beguin, U.S. Pat. No. 2,681,294. It is also within the scope of the invention to coat multiple layers simultaneously, using a slide coating hopper as in the patent to Mercier et al, U.S. Pat. No. 2,761,419 or the patent to Padday, U.S. Pat. No. 3,005,440 or, preferably, using an extrusion-slide hopper of the type disclosed in the patent to Russell et al, U.S. Pat. No. 2,761,417 or the patent to Jackson et al, U.S. Pat. No. 3,996,885. Also useful are multiple layer extrusion hoppers as in the patent to Russell, U.S. Pat. No. 2,761,418 and the patent to Mercier, U.S. Pat. No. 3,627,564, and other laminar flow coating methods described in Reafler patent application, Ser. No. 116,426 now abandoned cited above.

While laminar flow coating is greatly preferred, since it produces layers of the best uniformity, smoothness and gloss, it is also possible to make products within the scope of the invention by other coating methods. Other such methods include spray coating as disclosed, for example, in Research Disclosure 24,403 of July 1984; the patent to Short et al, U.S. Pat. No. 4,769,100 and European Patent Application 266 109 published May 4, 1988 (U.S. Pat. No. 4,810,540 of Rexham Corporation); bar coating as disclosed in European Patent Application 230 364 published Jul. 29, 1987 (Minnesota Mining and Manufacturing Company); and reverse roll coating as disclosured in European Patent Application 285 071 published Oct. 5, 1988 (Avery International Corporation). Even when using these other coating methods, certain advantages of the invention are obtained, such as improved resistance to marring and good adhesion of layers.

The paint layer can be coated on a support having an adhesion promoting tie-layer. Tie-layers can be formed from compositions comprising an adhesion promoting species and optionally a solvent. Useful adhesion promoting species include polymers derived from acrylonitrile, vinylidene chloride, and acrylic acid; polymers derived from methylacrylate, vinylidene chloride and itaconic acid; cellulose nitrate, and a variety of commercially available adhesion promoting species, for example, those known under the trade designations FORMVAR 7/95, FORMVAR 15/95, BUTVAR B-98 and BUTVAR B-72, sold by Monsanto, MOBAY N-50 sold by Mobay, VINAC B15sold by Air Products, ELVACITE sold by DuPont, and LEXAN sold by General Electric. Suitable solvents include methylethyl ketone, methylene chloride, tetrahydrofuran, toluene, methyl cellosolve, methanol, ethanol, propanol, butanol, mixtures thereof and the like. The tie-layer preferably has a thickness not greater than about 0.0025 millimeter and preferably is much thinner than the decorative and protective layer.

The optional adhesive back layer 16 in FIG. 2 preferably comprises a pressure-sensitive adhesive although heat activated and other adhesives can be used.

A pressure-sensitive adhesive layer can provide a tenacious bond between the substrate and the thermoformable sheet material. Preferred adhesives of this type are acrylic adhesives. Examples include acrylic copolymers of a higher alkyl acrylate such as 2-ethylhexyl acrylate copolymerized with a polar comonomer such as acrylic acid, acrylamide or maleic anhydride. The adhesive is coated from a solution with water or an organic solvent which also can contain additives such as a tackifier resin. Further examples of useful acrylic pressure-sensitive adhesives are described in the patent to Traynor et al, U.S. Pat. No. 4,726,982 of Feb. 23, 1988.

The adhesive layer preferably is applied to the carrier film by laminar flow coating as described in U.S. patent application Ser. No. 116,426 now abandoned at a dry thickness of about 0.04 to 0.12 (1.5-5 mils) millimeters.

In sheet material of the invention the carrier film, the paint layer, the clearcoat and the bonded transparent topcoat have heat softening and tensile elongation properties which render the sheet material suitable in the thermoforming process. These properties of the different layers are mutually compatible so as to permit substantial elongation by the stretching forces of thermoforming without crazing or delamination. The carrier film, paint layer, clearcoat and topcoat are of sufficiently uniform character that the sheet material exhibits substantially the same uniformity of appearance before and after the thermoforming process.

Preferably, both the topcoat and the clearcoat are clear. If desired, however, they can contain organic or inorganic colorants (i.e., pigments or dyes) provided that the concentration is sufficiently low that the layers remain transparent. Furthermore, although a smooth glossy topcoat is preferred for many purposes, it can, if desired, have a textured surface.

The glossy embodiments of the sheet material of the invention have a 20 degree gloss, as measured by ASTM Test D-2427, of at least 80. Preferred embodiments have a 20 degree gloss of at least 85 and, most preferably, at least 90. An outstanding advantage of the new sheet materials is that when heated and stretched during thermoforming from the unstressed relaxed state to an extended state having an extended area at least 50% greater than the relaxed area, the sheet material loses little or no gloss. Also the DOI and, for materials having metallic-flake-containing paint layers, the flop, remain high in the extended areas. Tests have shown that, even when stretched more than 100%, the 20 degree gloss in preferred materials remains above 80, and even above 90 for non-metallic basecoats, in the extended or stretched area.

The sheet material of the invention can be applied to a three-dimensional substrate by thermoforming with vacuum. The material is softened by heating, e.g., to a typical temperature of 115°-150° C., and plastically stretched during thermoforming to conform to the shape of the substrate. Portions of the sheet material may be stretched to an area which is up to 100% or even 150% greater than its original unstretched area. The material is thus brought into conforming contact with the substrate and is securely bonded to the substrate to form a smooth and wrinkle-free protective and decorative surface.

Alternatively, the sheet material can be applied to a substrate by the "in-mold" method. This involves molding a shaped article and simultaneously bonding it to the protective and decorative sheet material. The method comprises the steps of (1) positioning the sheet material over the molding surface of a mold, the topcoat being between the surface of the mold and the carrier film; (2) injecting into the mold a plastic composition which hardens to form the molded article and bonds to the carrier film; and (3) removing from the mold a molded substrate article having the sheet material bonded thereto. In this method the sheet material normally requires no adhesive on the back side of the carrier film since the carrier film bonds to the molded article by fusion. The term thermoforming includes the vacuum forming method and the in-mold method, both of which involve heating and stretching the sheet materials.

If desired, the sheet material can be vacuum thermoformed into a predetermined shape as described in European Patent Application 285 071 A2, published Oct. 5, 1988 (Avery International Corp.) before it is fused to a plastic substrate by the in-mold method.

Still another way of using the decorative sheet material of the invention is as a free film or toning and styling film. In this usage an ornamental strip of the sheet material is adhesively bonded to a substrate such as an automobile body or a boat hull. The film need not be thermoformable although flexibility and moderate stretchability are desirable. It is simply stretched along the length of the automobile body for example, and pressed by hand into adhesive contact with automobile. The film can be mildly heated to aid in conformance to moderate contours. Even in this usage, which does not require extensive stretching, the gloss, DOI, flop and mar-resistance of the sheet materials of the invention provide important advantages.

The invention is further illustrated by the following examples which provide a comparison between sheet materials according to the invention (having reactive silicone-containing topcoats) and other sheet materials.

EXAMPLE 1

Part A

A carrier film was prepared from a blend described in U.S. Pat. No. 4,582,876 as follows:

A mixture of 55:45% by weight of copolyester resin and Dylark ® Styrene Copolymer 600 was compounded by extrusion. The copolyester was derived from terephthalic acid, 19 mole % ethylene glycol and 81 mole % 1,4-cyclohexanedimethanol. Dylark ® Styrene Copolymer 600 is a rubber modified styrene-maleic anhydride copolymer available from ARCO Chemical Company, a division of Atlantic Richfield Company.

The blend was heated to 260°-290° C. and extruded through a die into a nip comprising two temperature-controlled chrome plated stainless steel rollers. The extruded web was then cooled on a chilled roller. The thermoplastic film has a mean thickness of about 0.20 mm (7.5 mils) and a maximum thickness deviation of less than 0.02 mm.

The carrier film prepared as described was coated with a thin layer of an aqueous tie coat composition as described in Table I. After drying, the thickness of the tie layer was approximately 0.0005 mm (0.02 mils).

TABLE I

| Tie Coat Composition | |
|---|---|
| Ingredients | Approx. % Wt. |
| Ethylene Glycol Monohexyl Ether | <1 |
| Deionized Water | 75 |
| N, N-Dimethyl Ethanolamine | <1 |
| N-Methylpyrrolidone | 1 |
| Diethylene Glycol Monobutyl Ether | 1 |
| Acrylic Resin* | 10 |
| Urethane Resin** | 10 |
| diluted with water to a total solids content of 3.0% by weight. | |

*Styrene butyl acrylate-butyl methacrylate terpolymer
**Reaction product of methylene dicyclohexyl diisocyanate and an aliphatic diol The black paint composition of Table II below was metered from a nitrogen gas pressurized vessel through a coating hopper extrusion slot having a width of 0.25 millimeter onto the carrier film moving at a speed of 8 m/min. The coating method and apparatus were substantially as described in U.S. Pat. No. 2,681,294 and included means for maintaining a pressure differential across opposite surfaces of the coating ribbon. The coating was dried at 40°–90° C. to a thickness of 0.04 mm (1.5 mil) in a plural-stage, continuous flat bed drying apparatus supplied with low velocity, warm air streams as described in the copending patent application of Fronheiser et al, Ser. No. 166,083 filed Mar. 9, 1988, now U.S. Pat. No. 4,872,270.

TABLE II

Paint Composition

| Ingredients | Approx. % Wt. |
|---|---|
| Melamine Formaldehyde Resin | 1 |
| Carbon Black | 1 |
| Ethylene Glycol Monohexyl Ether | 5 |
| Toluene | 1 |
| N, N-Dimethyl Ethanolamine | 1 |
| N-Methylpyrrolidone | 5 |
| Deionized Water | 60 |
| Normal Butyl Alcohol | <1 |
| Diethylene Glycol Monobutyl Ether | 5 |
| Urethane Resin | 20 |

The resulting black paint layer of the paint-coated film was thereafter coated with the following two-component clearcoat composition.

TABLE III

Clearcoat Composition

| Ingredient | Approx. % Weight |
|---|---|
| A* Polyol: | |
| Urethane Polyol Resin | 65 |
| Toluene | 35 |
| Benzotriazole Absorber | 1 |
| B** Polyisocyanate: | 100 |
| Polyfunctional aliphatic isocyanurate resin based on 1,6-hexamethylene diisocyanate | |

*Available as TKUS1002 from PPG Industries, Inc. The urethane polyol resin is a derivative of neopentyl glycol, isophorone diisocyanate and 1,4-cyclohexane-demethanol and has a number average molecular weight of about 2000 and a weight average molecular weight of about 6000.
**Available as Desmodur N-3300 from Mobay Corporation Coatings Division Component A diluted with toluene and Component B diluted with acetone were mixed and then immediately coated onto the paint layer and dried to form a clear layer having a thickness of 0.06 millimeters.

The paint-coated film having a polyurethane clearcoat as described above was used to prepare a series of films having a thin urethane-siloxane topcoat over the polyurethane clearcoat. The topcoat composition was formed by adding a reactive poly(dialkylsiloxane) to the polyol (Component A in Table III above) and then mixing that mixture with the polyisocyanate (Component B in Table III) immediately before feeding the mixture into the extrusion coating hopper.

In each of these preparations the amount of polydialkylsiloxane in mg/ft$^2$ was varied for different preparations in order to observe the effect of siloxane concentration. Three different siloxanes were used, namely, Dow Corning ® 1248 fluid, PS513 amine-terminated poly(dimethylsiloxane) and TEGO ® Glide 410 polysiloxane polyether copolymer, all of which have been described more fully above. In Table IV below they are identified, respectively, as DC1248, PS513 and TEGO 410.

Mar-resistance is difficult to quantify. However, a good correlation exists between mar-resistance and friction coefficient, which can be measured. Therefore, strips of the resulting films were subjected to friction coefficient measurements according to American National Standard IT9.4-1988 (American National Standards Institute, Inc., New York, N.Y.). One strip of each film was tested with no further treatment. A second strip, before testing, was scrubbed with a cloth soaked in isopropyl alcohol. This provided an indication of the permanence of any effect by the siloxane component on the friction coefficient. The results of the testing of these films and of a control film which had only a clearcoat and no urethane-siloxane topcoat are listed in Table IV for Films 1 (the control) through 13. The test results for another film (14) are also listed. Film 14 had no clearcoat, the urethane-siloxane topcoat being formed directly on the black paint layer. Otherwise, this film was the same as Film 13.

TABLE IV

| Film | Silicone | Poly(diakylsiloxane) Coverage (Mg/ft 2) | Friction Coefficient Not Scrubbed | Friction Coefficient Scrubbed w/i-PrOH |
|---|---|---|---|---|
| 1 (Control) | — | None | 0.55 | 0.55 |
| 2 | DC1248 | 0.05 | 0.53 | 0.6+ |
| 3 | " | 0.1 | 0.3 | 0.6 |
| 4 | " | 0.5 | 0.2 | 0.25 |
| 5 | " | 1.0 | 0.12 | 0.2 |
| 6 | PS513 | 0.05 | 0.3 | 0.57 |
| 7 | " | 0.1 | 0.24 | 0.57 |
| 8 | " | 0.5 | 0.11 | 0.18 |
| 9 | " | 1.0 | 0.12 | 0.14 |
| 10 | TEGO 410 | 0.05 | 0.43 | 0.56 |
| 11 | " | 0.1 | 0.35 | 0.6+ |
| 12 | " | 0.5 | 0.16 | 0.31 |
| 13 | " | 1.0 | 0.2 | 0.23 |
| 14 (No clearcoat) | " | 0.5 | 0.16 | 0.6+ |

The test results in Table IV show that the control, Film 1 which had no urethane-silicone topcoat, had a high friction coefficient (0.55) both before and after being scrubbed with isopropanol. The film had a correspondingly low mar-resistance.

Film 2, which had only 0.05 mg/ft$^2$ Poly(diakylsiloxane), had a high friction coefficient before scrubbing and it increased after scrubbing. Films 6 and 10 show similar results with the other reactive silicone components.

Films 3, 7, and 11, which before scrubbing had friction coefficients lower than the control, increased markedly in friction coefficient after scrubbing with alcohol.

This suggests that the urethane-silicone topcoat at the low Poly(diakylsiloxane) coverage of 0.1 mg/ft$^2$ probably had a small amount of unreacted silicone which was removed by scrubbing.

As shown by Films 4, 5, 8, 9, 12 and 13, when the Poly(diakylsiloxane) coverage was 0.5 mg/ft$^2$ or higher the initial friction coefficient was low and it remained low after scrubbing.

Film 14 shows the importance of having a clearcoat under the thin urethane-silicone topcoat. In this film which had only a topcoat the initial low friction coefficient increased markedly after the film was scrubbed with alcohol.

Basecoat-clearcoat films of the invention have also been compared for friction coefficient with films which are otherwise of the same composition but in which the clearcoat contains a non-reactive silicone compound and no urethane-silicone topcoat is formed over the clearcoat. For these comparative films the clearcoat was formed from the two-component urethane composition of Table III but mixing with the composition a non-reactive poly (dimethyl siloxane) known as DC200, the latter being a product of Dow Corning Corporation. In one formulation the amount of the silicone additive was 0.1 weight percent and in the other it was 0.5 weight percent, based on the solids content of the urethane composition.

Initially, the friction coefficients of the films containing the non-reactive silicone in their clearcoats were low, e.g., of the order of 0.18 and 0.15, as compared with 0.55 for the control film of Table IV which had no silicone in its surface layer. However, this low friction coefficient was not persistent. When the films were scrubbed with isopropanol and tested again the friction coefficients had risen to 0.53 for each film.

The paint-coated films of the invention are especially useful for bonding to three-dimensional substrates such as automobile panels by vacuum thermoforming or in-mold thermoforming. In these procedures the films not only have good mar resistance but they have good retention of surface qualities when stretched during thermoforming. This is especially important when the film is coated with a paint that contains metallic flakes. Such films when stretched show a tendency to lose gloss, DOI and flop in stretched areas. Furthermore, in films that are coated with certain mar-resistant compositions this loss of surface quality is pronounced. In films of the present invention, however, mar resistance is improved while the appearance qualities in the stretched areas are also retained.

The fact that the topcoat layer in the film of the present invention is thin permits the use of low viscosity topcoat compositions which can be coated successfully by extrusion hopper coating. However, this is not the only advantage resulting from the thinness of that layer. Another is the reduction in haziness of the clear layers. The reactive silicone components having a tendency to create haze in the coating composition. If the entire clearcoat contains a sufficient amount of the silicone component to improve the friction coefficient, this degree of haze becomes unacceptable. However, the present invention, by including the silicone component only in the thin topcoat layer, achieves mar resistance without excessive haze.

The invention has been described in detail with particular reference to preferred embodiments thereof, but it will be understood that variations and modifications can be effected within the spirit and scope of the invention.

We claim:

1. A protective and decorative stretchable thermoformable sheet material for bonding to substrates to provide a basecoat-clearcoat appearance comprising:
   a flexible, polymeric carrier film;
   a flexible paint layer coated on said carrier film;
   a polyurethane clearcoat layer coated on said paint layer, said clearcoat layer having a dry thickness of at least 0.025 mm; and
   a mar-resistant polyurethane clear topcoat layer coated on said clearcoat layer, the mar-resistant topcoat layer being thinner than said clearcoat layer, and said polyurethane of the clear topcoat layer being the reaction product of a mixture comprising a polyisocyanate and a reactive poly(dialkylsiloxane) having at least one reactive group which is reactive with the polyisocyanate to bond the poly(dialkylsiloxane) to the polyurethane chain of the clear topcoat layer,
   the thickness of the clearcoat layer being at least 10 times greater than that of the topcoat layer.

2. The sheet material of claim 1, wherein the amount of reactive poly(dialkylsiloxane) is sufficient to maintain the friction coefficient of the topcoat, after being scrubbed with isopropanol, below that of the clearcoat.

3. The sheet material of claim 2, wherein the topcoat poly(dialkylsiloxane) coverage is at least about 0.5 mg per square foot of sheet material.

4. The sheet material of claim 3, wherein the friction coefficient of the topcoat is less than about 0.25.

5. The sheet material of claim 1, wherein the reactive groups are active-hydrogen-containing groups selected from the group consisting of hydroxyl, mercapto, primary amino and secondary amino.

6. The sheet material of claim 5, wherein the paint layer also comprises a polyurethane.

7. The sheet material of claim 5, wherein the polyurethane clearcoat layer is formed from a polyol component and a polyisocyanate component and the mar-resistant polyurethane topcoat layer is formed from a mixture comprising the same type of polyol and polyisocyanate components plus a reactive poly(dialkylsiloxane) having at least two reactive groups selected from the group consisting of hydroxyl, mercapto, primary amino and secondary amino.

8. The sheet material of claim 7, wherein the reactive poly(dialkylsiloxane) is a poly(dimethylsiloxane) having at least two hydroxyl groups which are bonded to silicon via an alkylene group.

9. The sheet material of claim 1, wherein the total dry thickness of the clearcoat layer and the topcoat layer is at least 0.1 mm, and wherein the paint layer contains metallic flakes.

10. The sheet material of claim 6, wherein the polyurethane paint layer is water-based and the clearcoat and clear topcoat layers comprise cross-linked polyurethanes.

11. The sheet material of claim 1 wherein the dry thickness of the topcoat layer is not more than 0.005 mm.

12. The sheet material of claim 1 wherein the dry thickness of the topcoat layer is not more than 0.005 mm.

13. The sheet material of claim 1 wherein the dry thickness of the clearcoat layer is from 0.025 to 0.25 mm.

14. The sheet material of claim 1 wherein the dry thickness of the topcoat layer is from 0.0005 to 0.005 mm.

15. The sheet material of claim 13 wherein the dry thickness of the topcoat layer is from 0.0005 to 0.005 mm.

16. The sheet material of claim 1 wherein the total dry thickness of the clearcoat layer and the topcoat layer is at least 0.1 mm and the thickness of the clearcoat layer is from 10 to 100 times greater than that of the topcoat layer.

* * * * *